US012523828B1

(12) United States Patent
Dosunmu et al.

(10) Patent No.: US 12,523,828 B1
(45) Date of Patent: Jan. 13, 2026

(54) HIGH BANDWIDTH DENSITY OPTICAL INTERFACES FOR CO-PACKAGED DEVICES INCLUDING PHOTONIC INTEGRATED CIRCUITS (71) Applicant: Applied Materials, Inc., Santa Clara, CA (US)

(72) Inventors: Olufemi I. Dosunmu, San Jose, CA (US); Robert Blum, Mountain View, CA (US); Zijiao Yang, Fremont, CA (US); Jinxin Fu, Santa Clara, CA (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 19/209,166

(22) Filed: May 15, 2025

Related U.S. Application Data (60) Provisional application No. 63/711,835, filed on Oct. 25, 2024.

(51) Int. Cl.
*G02B 6/42* (2006.01)
*G02B 6/02* (2006.01)
*G02B 6/43* (2006.01)

(52) U.S. Cl.
CPC ....... *G02B 6/4214* (2013.01); *G02B 6/02042* (2013.01); *G02B 6/02342* (2013.01); *G02B 6/43* (2013.01)

(58) Field of Classification Search
CPC .................................................. G02B 6/4214
USPC .......................................................... 385/14
See application file for complete search history.

(56) References Cited

U.S. PATENT DOCUMENTS

| | | | |
|---|---|---|---|
| 8,213,751 B1* | 7/2012 | Ho | G02F 1/035 385/11 |
| 8,837,878 B2 | 9/2014 | Chen | |
| 10,527,786 B2* | 1/2020 | Leonberger | G02B 6/12028 |
| 11,435,528 B1 | 9/2022 | Gao | |
| 11,982,848 B2* | 5/2024 | Elsinger | G02B 6/4208 |
| 12,055,766 B2* | 8/2024 | Pupalaikis | G02B 6/3628 |
| 12,149,242 B1* | 11/2024 | Gimeno-Segovia | H03K 17/92 |
| 2008/0044128 A1* | 2/2008 | Kish | G02B 6/12033 385/14 |
| 2010/0254705 A1* | 10/2010 | Perkins | H04J 14/0205 398/48 |
| 2013/0318503 A1 | 11/2013 | Li | |
| 2017/0207600 A1 | 7/2017 | Klamkin | |
| 2018/0081118 A1* | 3/2018 | Klamkin | H01S 5/02326 |
| 2018/0348436 A1* | 12/2018 | Pottier | G02B 6/2931 |
| 2021/0320726 A1 | 10/2021 | Kalman | |
| 2022/0065407 A1 | 3/2022 | Wei | |
| 2022/0263586 A1* | 8/2022 | Winzer | G02B 6/4293 |

(Continued)

FOREIGN PATENT DOCUMENTS

WO WO-2022067268 A2 * 3/2022 ......... H10F 77/1437
WO WO-2023168095 A1 * 9/2023 ........... G02B 6/4292

*Primary Examiner* — Kaveh C Kianni
(74) *Attorney, Agent, or Firm* — Lowenstein Sandler LLP (57) ABSTRACT An optical interface includes a cladding layer having a plurality of inner cores and a plurality of turning elements formed therein. Each inner core the plurality of inner cores is associated with a respective turning element of the plurality of turning elements. The optical interface further includes an array of optical elements formed on the cladding layer. Each optical element of the array of optical elements is associated with a respective turning element of the plurality of turning elements.

12 Claims, 8 Drawing Sheets (56) References Cited

U.S. PATENT DOCUMENTS

| | | | |
|---|---|---|---|
| 2023/0354541 A1* | 11/2023 | Cole | ........................ H05K 7/10 |
| 2023/0366913 A1* | 11/2023 | Kamineni | ........... H10F 77/1437 |
| 2023/0418002 A1 | 12/2023 | Tseng | |
| 2024/0027698 A1 | 1/2024 | Psaila | |
| 2024/0061170 A1 | 2/2024 | Wei | |
| 2024/0085633 A1* | 3/2024 | Chen | .................... G02B 6/4214 |
| 2024/0369783 A1 | 11/2024 | Yu | |
| 2024/0427097 A1* | 12/2024 | Yu | ........................... G02B 6/43 |
| 2025/0251557 A1* | 8/2025 | Yang | ......................... G02B 6/30 |
| 2025/0277746 A1* | 9/2025 | LaChapelle | ........ A61B 5/14532 |

* cited by examiner

```
┌─────────────────────────────────┐
│ Form a plurality of inner cores │
│  within at least one cladding   │
│             layer               │
│             610A                │
└─────────────────────────────────┘
                 │
                 ▼
┌─────────────────────────────────┐
│  Form a plurality of turning    │
│  elements within the at least   │
│       one cladding layer        │
│             620A                │
└─────────────────────────────────┘
                 │
                 ▼
┌─────────────────────────────────┐
│ Form an array of optical        │
│ elements on the at least one    │
│         cladding layer          │
│             630A                │
└─────────────────────────────────┘
```

```
┌─────────────────────────────────┐
│ Form, on an optical interface,  │
│  a PIC substrate associated     │
│           with a PIC            │
│             610B                │
└─────────────────────────────────┘
                 │
                 ▼
┌─────────────────────────────────┐
│  Form an interposer substrate   │
│     on the optical interface    │
│             620B                │
└─────────────────────────────────┘
                 │
                 ▼
┌─────────────────────────────────┐
│ Form an optical fiber array     │
│ connector on the optical        │
│            interface            │
│             630B                │
└─────────────────────────────────┘
```

FIG. 6B

HIGH BANDWIDTH DENSITY OPTICAL INTERFACES FOR CO-PACKAGED DEVICES INCLUDING PHOTONIC INTEGRATED CIRCUITS

CROSS-REFERENCE TO RELATED APPLICATION(S)

The present application claims priority to U.S. Provisional Patent Application No. 63/711,835, filed on Oct. 25, 2024 and entitled "HIGH BANDWIDTH DENSITY OPTICAL INTERFACES FOR CO-PACKAGED DEVICES INCLUDING PHOTONIC INTEGRATED CIRCUITS", the entire contents of which are hereby incorporated by reference herein.

TECHNICAL FIELD

Embodiments of the present disclosure relate to optical systems, and more particularly to high bandwidth density optical interfaces for co-packaged optical devices including photonic integrated circuits (PICs).

BACKGROUND

In an optical system, an optical signal can travel through a waveguide (e.g., optical fiber) that is formed from an inner core made of a first material having a first index of refraction and an outer cladding made of a second material having a second index of refraction less than the first index of refraction. For example, the first material and the second material can each be formed from a different type of glass. Thus, when an optical signal traveling in a waveguide is incident on the boundary between the inner core and the outer cladding at an angle exceeding the critical angle, the optical signal can exhibit total internal reflection.

SUMMARY

In some embodiments, an optical interface includes a cladding layer having a plurality of inner cores and a plurality of turning elements formed therein. Each inner core the plurality of inner cores is associated with a respective turning element of the plurality of turning elements. The optical interface further includes an array of optical elements formed on the cladding layer. Each optical element of the array of optical elements is associated with a respective turning element of the plurality of turning elements.

In some embodiments, a system includes an interposer substrate, a photonic integrated circuit (PIC) substrate associated with a PIC, an optical fiber array connector associated with an optical fiber array, and an optical interface between the PIC and the optical fiber array. The optical interface includes a cladding layer, formed on the interposer substrate, having a plurality of inner cores and a plurality of turning elements formed therein. Each inner core the plurality of inner cores is associated with a respective turning element of the plurality of turning elements. The optical interface further includes an array of optical elements formed between the cladding layer and the optical fiber array connector. Each optical element of the array of optical elements is associated with a respective turning element of the plurality of turning elements In some embodiments, a method includes forming a plurality of inner cores within a cladding layer. forming a plurality of turning elements within the cladding layer. Each inner core the plurality of inner cores is associated with a respective turning element of the plurality of turning elements. The method further includes forming an array of optical elements on the cladding layer. Each optical element of the array of optical elements is associated with a respective turning element of the plurality of turning elements.

Numerous other aspects and features are provided in accordance with these and other embodiments of the disclosure. Other features and aspects of embodiments of the disclosure will become more fully apparent from the following detailed description, the claims, and the accompanying drawings.

BRIEF DESCRIPTION OF THE DRAWINGS

The present disclosure is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

FIGS. 2-3C are diagrams of example implementations of systems that include high bandwidth density optical interfaces for co-packaged optical devices including photonic integrated circuits (PICs), according to some embodiments.

DETAILED DESCRIPTION

Embodiments of the present disclosure relate to high density interposer optical interfaces for co-packaged devices including photonic integrated circuits (PICs). A co-packaged device (e.g., multi-chip module) can include a package substrate having multiple PICs assembled closely together. More specifically, optical components can be integrated on substrates (e.g., silicon (Si) substrate) for fabricating large-scale PICs that co-exist with micro-electronic chips. With the use of an optical transceiver, a received optical signal can be converted to an electrical signal capable of being processed by an integrated circuit, or the processed electrical signal can be converted to an optical signal to be transmitted via an optical fiber.

Instead of ICs (e.g., microchips) that utilize electrons to process information, referred to as electronic ICs (EICs), a PIC utilizes photons (light particles) to process information. A PIC can include multiple photonic components connected on a single chip. Examples of components of a PIC include optical signal generators (e.g., lasers) to generate optical signals (e.g., light), waveguides to direct optical signals within the PIC (e.g., similar to wires used to direct electrons), modulators to modulate optical signals to encode information, and detectors to detect and decode the information from the optical signals.

A co-packaged device can include an interconnect device ("interconnect") disposed between a first component and a second component. For example, an interconnect can be a placed between a package substrate and a ball grid array. In some embodiments, an interconnect includes an interposer. An interposer is an electrical interface that routes connections between sockets or connections between the first component and the second component. An interposer can be used to connect components that may not naturally connect to one another. Some interconnects (e.g., interposers) can include multiple conductive layers (e.g., metal layers), where pairs of conductive layers are connected by at least one conductive via ("via"). For example, a first conductive layer of a first metallization level and a second conductive layer of a second metallization level can be connected by at least one via. Some interconnects (e.g., interposers) can further include multiple waveguides integrated near the conductive layers.

The waveguides of an interconnect can use evanescent wave coupling to transmit an optical signal received from an initial waveguide of the interconnect to a final waveguide of the interconnect. For example, the initial waveguide can be integrated near a bottom conductive layer of the interconnect, and the final waveguide can be integrated near a top conductive layer of the interconnect. Evanescent wave coupling generally refers to a (quantum) tunneling phenomenon in which an evanescent wave exiting a first medium excites a wave in an adjacent medium that is sufficiently close to the first medium. For example, in an optical communication system, evanescent wave coupling can occur when an evanescent wave generated within a waveguide excites an electromagnetic wave in an adjacent waveguide. Evanescent wave coupling can be accomplished when two waveguides are positioned close together such that the evanescent field generated by one of the waveguides reaches the other waveguide before any substantial decay of the evanescent wave is experienced. Generally, an evanescent wave is an oscillating wave (e.g., electromagnetic wave or acoustic wave) generated at a boundary between two media and exists only within a very short distance from the boundary. Evanescent waves can exit the waveguide, and their amplitude can decay exponentially as a function of distance from the boundary. Thus, evanescent waves are generally observable in the near field of the optical signal in close proximity to the boundary.

An optical connection between a fiber or fiber array and the PIC optical waveguide, also referred to herein as a connector, can include a connection substrate having multiple grooves formed therein, into which multiple respective optical fibers can be inserted and secured. Each optical fiber can be optically coupled to a respective waveguide. A connection substrate can be formed with a geometry that can provide the proper spacing to achieve optical coupling (e.g., evanescent wave coupling). For example, a large number of optical fiber-to-waveguide couplings may be needed for a multichannel wavelength division multiplexing (WDM) optical system.

Typically, a PIC implementing a multichannel wavelength division multiplexing (WDM) system includes active components such as modulators, multiplexers, etc. For example, a given modulator can receive an optical signal from an optical signal source, and generate a modulated wave. A set of modulated waves generated from a set of optical signals can be combined using a respective multiplexer to generate a multiplexed wave for a given channel. Such one-to-one optical fiber-to-waveguide connections can require a large number of optical fiber-to-waveguide couplings for a multichannel WDM system. For example, the number of couplings can be n*m, where n is the number of optical signal sources (e.g., light sources) and m is the number of lanes of the multichannel WDM system. Accordingly, it can be difficult to scale up the number of channels in an optical system.

One challenge related to optical input/output (I/O) designs targeted for some types of architectures including PICs and optical fibers, such as artificial intelligence (AI) cluster architectures, is matching of optical bandwidth density with electrical bandwidth density with respect to optical fiber coupling to the optical I/O. In particular, the optical bandwidth density can be lower than the electrical bandwidth density at the interface, and so the limiter can be located on the optical side.

For example, one potential optical fiber coupling solution to the optical I/O is a one-dimensional (1D) approach. One example of a 1D approach is implementing photonic IC edge coupling from embedded optical waveguides to a V-groove array of optical fibers. More specifically, a V-groove array can include a substrate having multiple V-grooves formed therein, where a V-groove is an opening that has a tapered shape in which the sides of the groove converged to a point (e.g., triangular shape). Each optical fiber can be inserted into a V-groove and secured in the V-groove using an adhesive (e.g., glue). The maximum density of these V-groove optical fiber arrays can be a function of optical fiber cladding layer size, which can limit a distance between adjacent optical fibers within the optical fiber array (e.g., optical fiber pitch).

For current optical I/O bandwidth enabled through photonic IC edge coupling to a fiber array, the optical bandwidth density (e.g., optical "beachfront" bandwidth density) can be limited to, e.g., about 1.4 terabits per second per millimeter (Tb/s/mm). This 1.4 Tb/s/mm optical bandwidth density can assume a maximum per-channel bit rate of 200 gigabits per second (Gb/s), a single wavelength per optical fiber, and a minimum optical fiber pitch of 127 micrometers ($\mu$m). However, the expected electrical bandwidth density (e.g., electrical "beachfront" bandwidth density) may exceed 10 Tb/s/mm.

Another potential optical fiber coupling solution to the optical I/O is vertical coupling using a two-dimensional (2D) approach. One example of a 2D approach is vertically coupling a grating coupler array to a two-dimensional (2D) optical fiber array. While 2D approaches using grating coupler arrays can enable increased optical bandwidth density as compared to 1D approaches (e.g., the V-groove approach), the potential for higher loss, narrower spectral bandwidth and higher polarization sensitivity of 2D approaches using grating coupler arrays may render them nonviable solutions for scaling optical bandwidth density with electrical bandwidth density.

Aspects and implementations described herein can address these and other drawbacks by providing high density interposer optical interfaces for co-packaged devices including PICs. Embodiments described herein provide for a viable 2D approach to optical fiber coupling using an interposer to enable optical bandwidth density to scale with electrical bandwidth density. For example, embodiments described herein provide for a 2D optical fiber coupling solution that can be lower-loss and more spectrally broadband and polarization insensitive, as compared to other 2D optical fiber solutions (e.g., grating coupler arrays).

A system described herein can include a set of PICs formed on an interposer. The interposer can include a substrate and an optical interface formed on the substrate.

The substrate of the interposer can include any suitable material. In some embodiments, the substrate of the interposer is a silicon (Si) substrate.

The optical interface can include a thick cladding layer and multiple turning elements each including a reflective material (e.g., metal reflector) formed within a respective trench of the thick cladding layer. In some embodiments, the cladding layer includes an array of micro-trenches, each having a turning element formed therein. In some embodiments, a turning element is a mirror. For example, a turning element can be an angled mirror formed along an angled sidewall of a trench. The thick cladding layer can include any suitable dielectric material. In some embodiments, the thick cladding layer is formed from an oxide material. For example, the thick cladding layer can be formed from silicon dioxide ($SiO_2$). The thick cladding layer can have any suitable thickness. In some embodiments, the thickness of the thick cladding layer ranges from about 5 μm to about 20 μm.

Multiple parallel inner cores can be formed within the thick cladding layer to form multiple parallel waveguides, and each turning element can be coupled (e.g., edge coupled) to a respective inner core of the multiple parallel inner cores. Each inner core of the multiple parallel inner cores can be formed from any suitable material. Inner core material generally has a higher refractive index than cladding layer material to form effective optical waveguides. In some embodiments, an inner core is formed from silicon nitride ($Si_3N_4$).

The optical interface can further include an array of optical elements formed on the thick cladding layer. The array of optical elements can function as optical I/O to the optical fibers. For example, the array of optical elements can collimate light to increase alignment tolerance. More specifically, each optical element of the array of optical elements can direct light and/or focus redirected by a respective turning element (e.g., reflected off a respective angled mirror) toward a respective optical fiber of an optical fiber array. The array of optical elements can include any suitable optical elements and/or combinations of optical elements in accordance with embodiments described herein.

In some embodiments, the array of optical elements is a 2D lens array. For example, the array of optical elements can include one or more metalenses (e.g., an array of metalenses). A metalens is an ultra-thin, flat optical element that can focus or manipulate light. For example, a metalens can interact with light, altering its phase, amplitude, or polarization. By precisely controlling the shape, size, and arrangement of a metalens, the metalens can be designed to achieve various optical functions, such as focusing, beam shaping, creating holographic images, etc. Multiple metalenses can form a metalens array on the backside of the PIC. A metalens can have sub-wavelength dimensions. In some embodiments, a metalens has a dimension that ranges from about 0.5 micrometer (μm) to about 2 μm. A metalens can be formed from any suitable material. The type of material can depend on a variety factors, such as target wavelength (visible light, infrared, etc.), efficiency, ease of fabrication, cost, etc. Examples of materials that can be used to form a metalens include silicon (Si), dielectric materials (e.g., titanium dioxide ($TiO_2$) and gallium nitride (GaN)), semiconductor materials (e.g., silicon nitride (SiN) and zinc selenide (ZnSe)), phase-change materials (e.g., germanium-antimony-tellurium (GST) and vanadium dioxide ($VO_2$)), transition metal dichalcogenides (e.g., molybdenum disulfide ($MoS_2$), tungsten disulfide ($WS_2$), tungsten diselenide ($WSe_2$), molybdenum ditelluride ($MoTe_2$), rhenium disulfide ($ReS_2$)), carbon (C) (e.g., graphene), metals (e.g., gold (Au) and silver (Ag)), etc.

As another example, the array of optical elements can include one or more microlenses (e.g., an array of microlenses). A microlens can have a sphere or hemisphere shape that can function based on similar principles as a traditional curved lens. A microlens can have a diameter typically less than 1 millimeter (mm). In some embodiments, a microlens has a diameter that ranges from about 100 μm to about 200 μm. The small size of microlenses can enable microlenses to focus light onto specific points. Microlenses can be formed from polymers, glass or other suitable optical materials. The type of material can depend on a variety factors, such as target wavelength (visible light, infrared, etc.), application (imaging, sensing, light coupling, etc.) efficiency, ease of fabrication, cost, etc. Examples of polymers that can be used to form a microlens include polymethl methacrylate (PMMA), polycarbonate (PC), epoxy, etc. Examples of glasses that can be used to form a microlens include Si, fused silica ($SiO_2$), chalcogenide glass, other optical glasses, etc.

In some embodiments, an additional cladding layer is formed on the thick cladding layer The additional cladding layer can include any suitable dielectric material. In some embodiments, the additional cladding layer is formed from an oxide material. For example, the additional cladding layer can be formed from $SiO_2$. The additional cladding layer can have a smaller thickness than the thick cladding layer. Multiple tapered inner cores can be formed within the additional cladding layer to form multiple tapered waveguides. In these embodiments, each of the inner cores formed within the additional cladding layer can be configured to enable evanescent wave coupling of an optical signal with respect to a respective inner core formed within the thick cladding layer. Each inner core of the multiple tapered inner cores can be formed from any suitable material. The material of the inner cores can have a higher refractive index than the cladding layer to form an effective optical waveguide. In some embodiments, an inner core is formed from $Si_3N_4$.

In some embodiments, the minimum pitch of turning elements (e.g., in the vertical direction when viewing the interposer from a top-down view) can be determined based at least in part on a minimum optical fiber pitch. The number of columns of turning elements (e.g., in the horizontal direction when viewing the interposer from a top-down view) can be determined based at least in part by a minimum mirror width (e.g., process-defined), and the maximum optical waveguide density that can be routed between turning elements. Illustratively, for a 1D array of waveguides within the thick cladding layer, a 10 μm waveguide pitch within the thick cladding layer can be considered safe. For example, "safe" refers to the minimum safe distance between optical waveguides that ensures no unwanted optical coupling between adjacent waveguides. If the spacing were reduced below 10 μm, then there is greater probability for optical crosstalk between adjacent waveguides.

Such a pitch can limit the maximum number of columns of turning elements to 11. Assuming a 127 μm pitch for the turning elements, a 200 gigabit/lane bandwidth, 11 columns of turning elements, and 7 turning elements per column within a 1 millimeter (mm) interposer shoreline, the maximum optical bandwidth density that can be achieved using the optical interface can be approximately 15.4 Tb/s/mm. Accordingly, optical interfaces described herein can achieve optical bandwidth densities that are greater than or equal to about 10 Tb/s/mm to match electrical bandwidth densities.

Embodiments described herein can provide for numerous other technical advantages. For example, embodiments described herein can reduce evanescent wave decay within devices (e.g., interconnects), which can improve the ability of waveguides of these devices to transmit optical signals. Embodiments described herein can reduce the size of a PIC, which can reduce costs, and enable more PICs to be used per area on the interconnect to increase the area bandwidth density. Further details regarding high density interposer optical interfaces for co-packaged devices including PICs will now be described below with reference to FIGS. 1-6B.

Figure 1A:
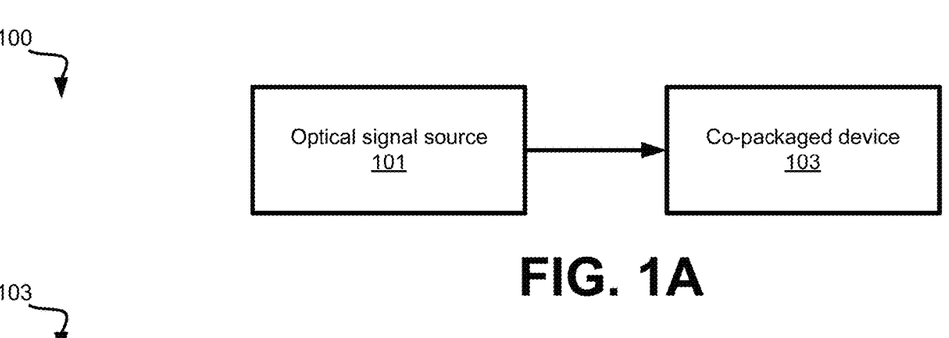
FIGS. 1A-1C are diagrams of views of example systems that implement high bandwidth density optical interfaces for co-packaged optical devices including photonic integrated circuits (PICs), according to some embodiments.

FIG. 1A is a block diagram of system 100, according to some embodiments, As shown, the system 100 can include optical signal source 101 and co-packaged device 103. Optical signal source 101 can provide, as input to co-packaged device, multiple wavelengths of optical signals (e.g., multiple wavelengths of light). For example, optical signal source 101 can include multiple optical signal generators (e.g., lasers) that each generate a respective wavelength of an optical signal. An example of co-packaged device 103 will now be described below with reference to FIGS. 1B-1C.

Figure 1B:
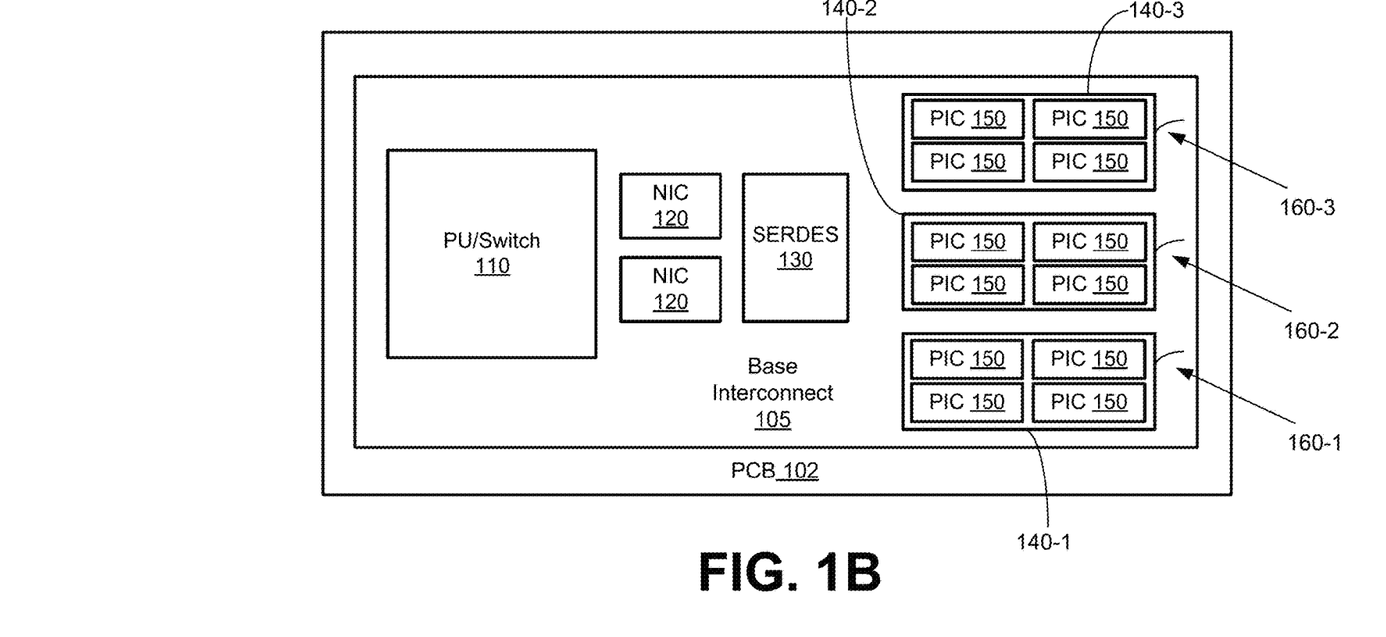
Figure 1C:
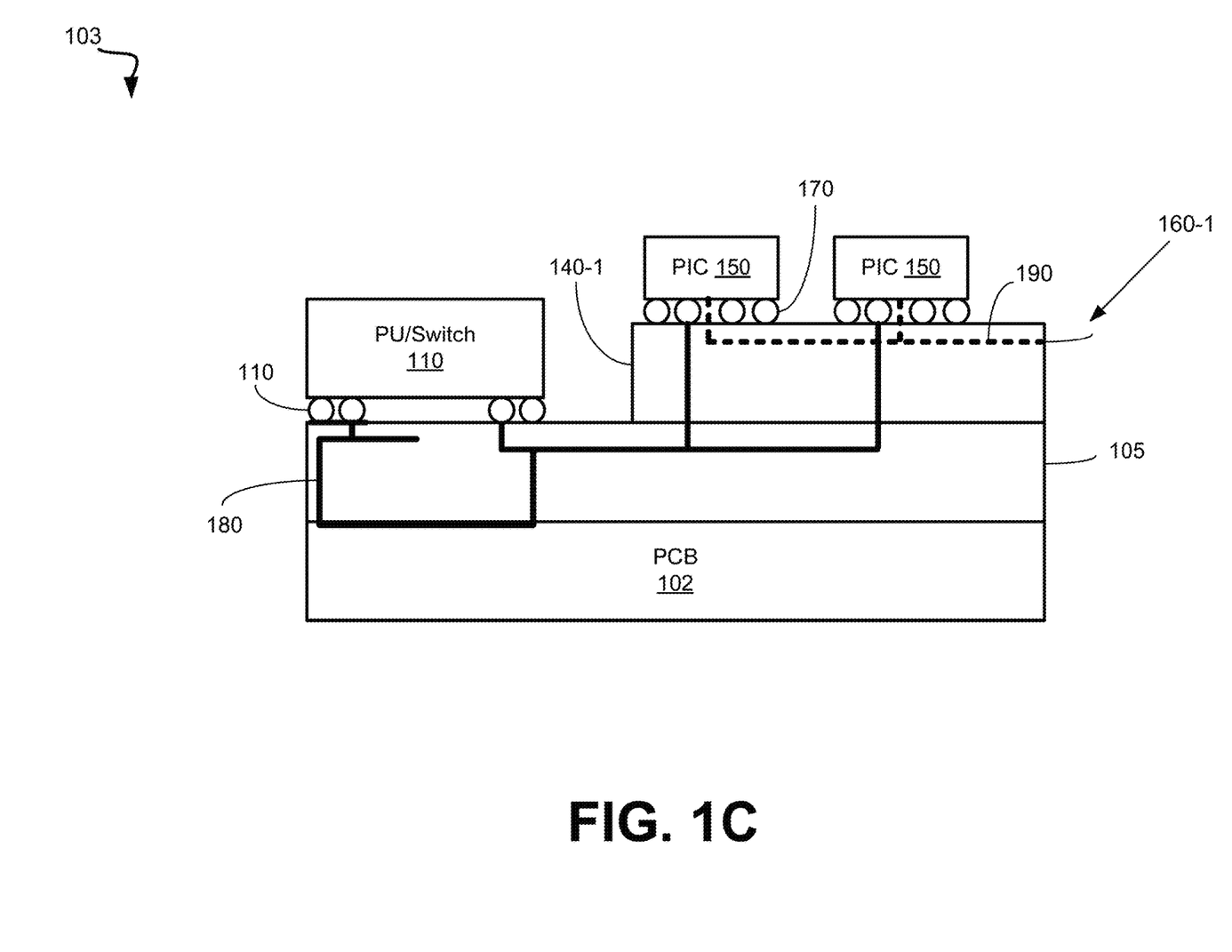

FIGS. 1B-1C are block diagrams of views of co-packaged device 103, according to some embodiments. More specifically, FIG. 1B is a top-down view of co-packaged device 103, and FIG. 1C is a side view of co-packaged device 103.

As shown in FIG. 1B, co-packaged device 103 can include printed circuit board (PCB) 102, base interconnect (e.g., interposer) 105, at least one processing unit and/or switch (PU/switch) 110 disposed on base interconnect 105, at least one network interface card (NIC) 120 disposed on base interconnect 105, serializer-deserializer (SERDES) 130 disposed on base interconnect 105, multiple interconnects 140-1 through 140-3 disposed on base interconnect 105, multiple photonic integrated circuits (PICs) 150 disposed on each of interconnects 140-1 through 140-3, and multiple waveguides 160-1 through 160-3 each coupled to a respective one of interconnects 140-1 through 140-3. In some embodiments, and as shown, the number of interconnects is three. However, the number of interconnects should not be considered limiting. In some embodiments, and as shown, each set of PICs 750s includes four PICs. However, the number of PICs should not be considered limiting.

More specifically, each of interconnects 140-1 through 140-3 can be disposed between respective sets of PICs 150 and base interconnect 105. For example, as further shown in FIG. 1C, bumps 170 are disposed between PU/Switch 110 and base interconnect 105, and between PICs 150 and interconnects 140-1 through 140-3. Conductive wires 180 can be formed through the base interconnect 105 and the interconnects 140-1 through 140-3 to enable electrical connections between components of co-packaged device 103 (e.g., PU/switch 110 and PICs 150). Additionally, through each of interconnects 140-1 through 140-3, a respective waveguide system 180 can be formed to provide optical signals to the PICs 150.

Figure 2:
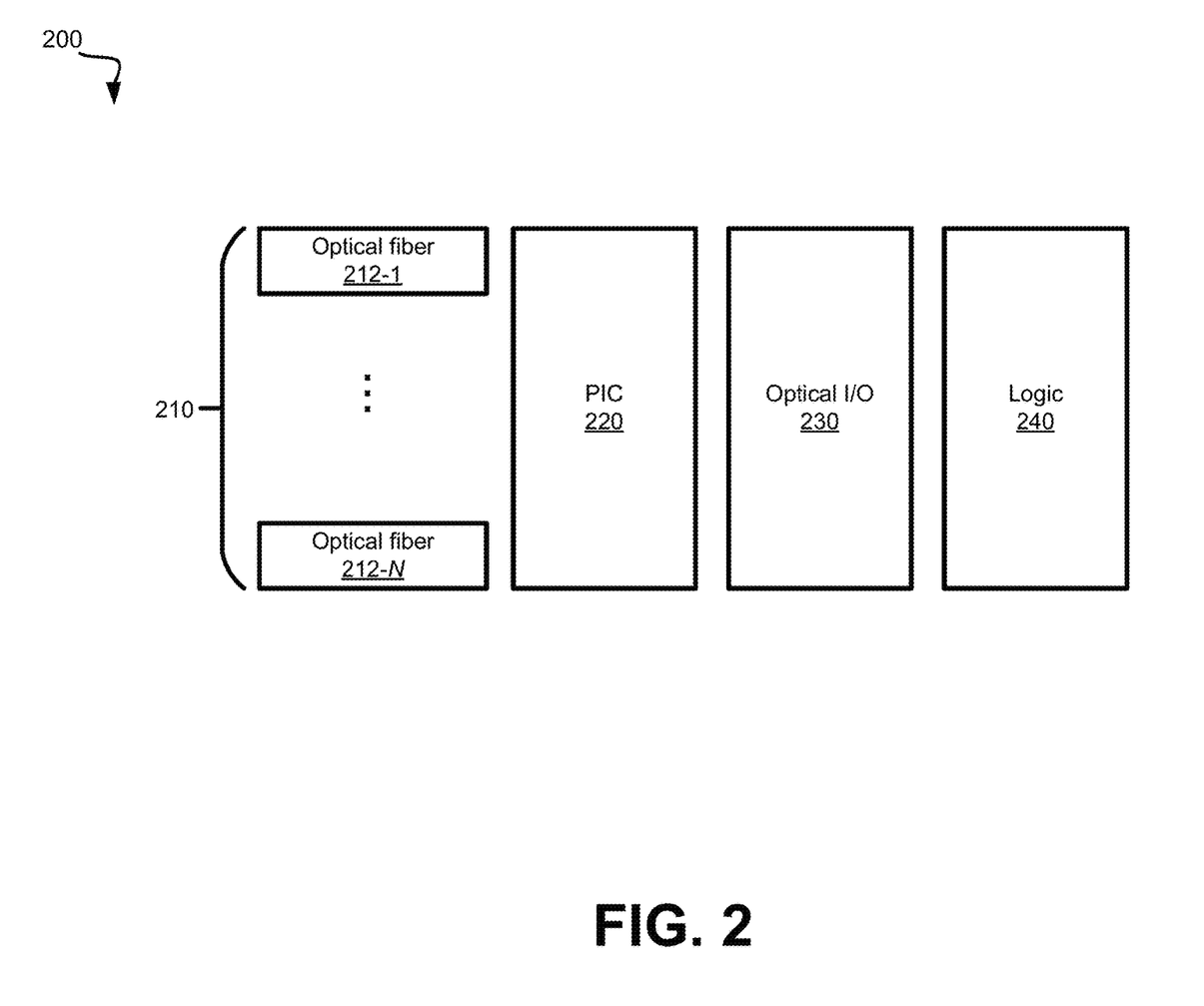

FIG. 2 is a block diagram of a top-down view of an example system 200, according to some embodiments. As shown, the system 200 can include an optical fiber array 210 including N optical fibers 212-1 through 212-N. The system 200 can further include at least one PIC 220, optical I/O 230 and logic 240. The system 200 can correspond to an AI cluster architecture in some embodiments. As described above, the expected electrical bandwidth density (e.g., electrical "beachfront" bandwidth density) associated with the logic 240 may exceed 10 Tb/s/mm. As will now be described below with reference to FIGS. 3A-3C, an optical interface between a PIC and an optical fiber array can be used to achieve optical bandwidth densities that are greater than or equal to about 10 Tb/s/mm to match electrical bandwidth densities.

Figure 3A:
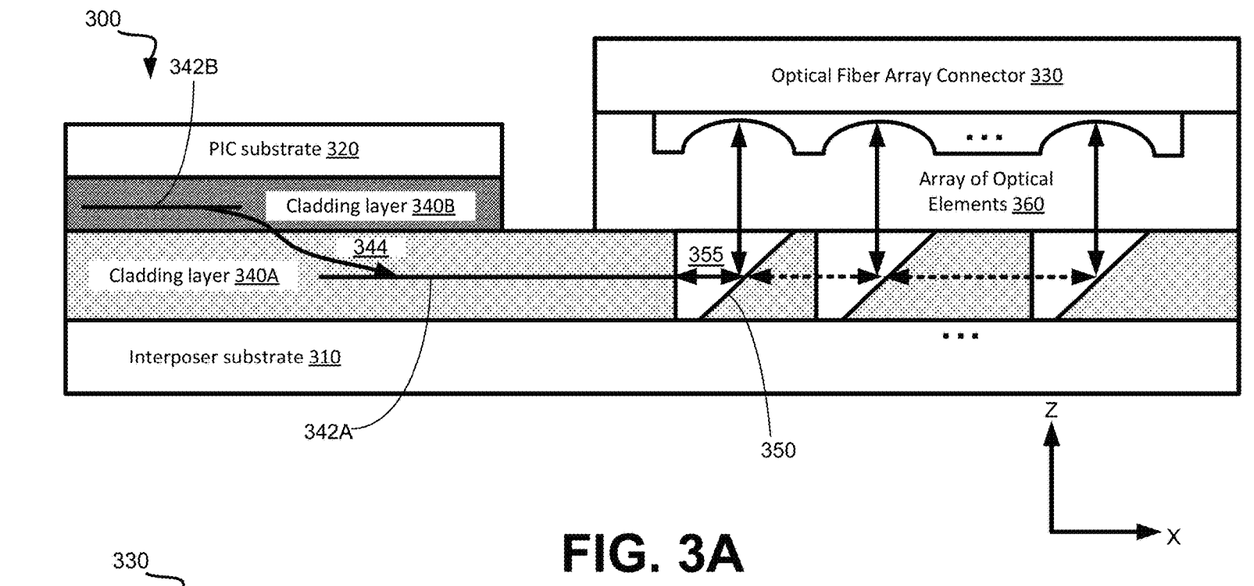

FIG. 3A is a diagram of cross-sectional view of an example system 300, according to some embodiments. As shown in FIG. 3A, the system 300 can include an interposer substrate 310 of an interposer, a PIC substrate 320 of a PIC, and an optical fiber array connector 330 associated with an optical fiber array (e.g., the optical fiber array 210 of FIG. 2).

Figure 3B:
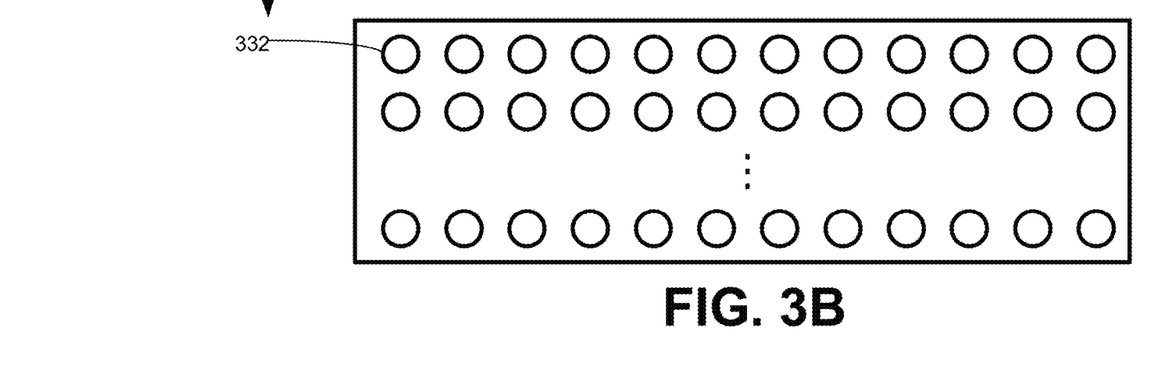

FIG. 3B is a diagram of a bottom-up view of an example optical fiber array connector 360, according to some embodiments. As shown in FIG. 3B, the optical fiber array connector 360 includes multiple channels 362 arranged in rows. In this illustrative embodiment, each row includes 12 channels. In some embodiments, there are 6 rows that each include 12 channels (i.e., 72 channels). However, the number of channels, rows of channels and/or number of channels within each row should not be considered limiting.

Referring back to FIG. 3A, the system 300 can further include an optical interface, formed on the interposer substrate 310, between the PIC substrate 320 and the optical fiber array connector 330. The optical interface can include a cladding layer 340A formed on the interposer substrate. More specifically, the cladding layer 340A can be a thick cladding layer. In some embodiments, the thickness of the cladding layer 340A ranges from about 5 μm to about 20 μm. The cladding layer 340A can include any suitable dielectric material. In some embodiments, the cladding layer 340A is formed from an oxide material. For example, the cladding layer 340A can be formed from $SiO_2$.

The cladding layer 340 can include multiple (e.g., an array of) small trenches, referred to herein as micro-trenches. Each micro-trench of the cladding layer 340A can have a turning element 350 formed therein. Each turning element may include a reflective material (e.g., metal reflector) formed within a respective trench of the cladding layer 340A (e.g., formed on an angled trench wall of a respective trench). In some embodiments, the turning element 350 is a mirror. For example, the turning element 350 can be an angled mirror formed along an angled sidewall of its corresponding trench.

Multiple parallel inner cores, including inner core 342A, can be formed within the cladding layer 340A to form multiple parallel waveguides, and each turning element can be coupled (e.g., edge coupled) to a respective inner core of the multiple parallel inner cores (e.g., the turning element 350 coupled to the inner core 342A). The multiple parallel inner cores, including the inner core 342A, can be formed from any suitable material. The multiple parallel inner cores, including the inner core 342A, can have a higher refractive index than the cladding layer 340A to form effective optical waveguides. In some embodiments, the inner core 342A is formed from $Si_3N_4$.

Figure 3C:
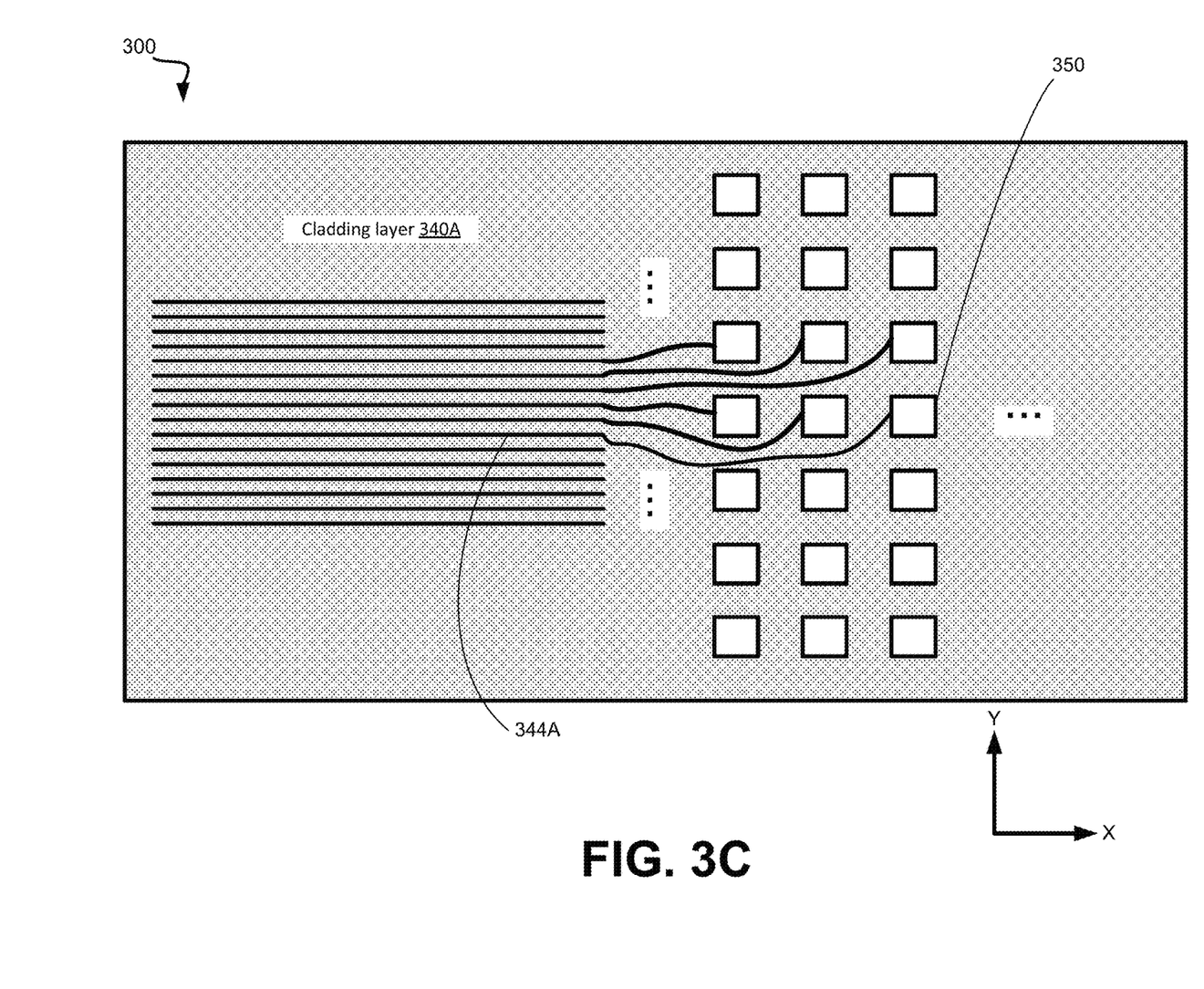

FIG. 3C is a diagram of a top-down view of the system 300 showing example connections between the multiple inner cores including the inner core 344A and respective ones of the turning elements including the turning element 350, according to some embodiments.

Referring back to FIG. 3A, the optical interface can further include an array of optical elements 360 formed on the thick cladding layer. The array of optical elements 360 can function as optical I/O to the optical fibers. For example, the array of optical elements 360 can collimate light to increase alignment tolerance. More specifically, each optical element of the array of optical elements 360 can direct light redirected by a respective turning element (e.g., reflected off a respective angled mirror) toward a respective optical fiber of an optical fiber array associated with the optical fiber array connector 330. The array of optical elements 360 can include any suitable optical elements and/or combinations of optical elements in accordance with embodiments described herein. In some embodiments, the array of optical elements is a 2D lens array. For example, the array of optical elements can include one or more metalenses and/or one or more microlenses.

In some embodiments, and as shown in FIG. 3A, an additional cladding layer 340B is formed on the cladding layer, and waveguides (e.g., tapered waveguides) including respective inner cores (e.g., inner core 342B) are formed within the additional cladding layer 340B. Each of the inner cores formed within the cladding layer 340B can be configured to enable evanescent wave coupling of an optical signal with respect to a respective inner core formed within the cladding layer 340A (e.g., evanescent wave coupling between the inner core 342A and the inner core 342B, as indicated by the arrow 344).

In some embodiments, the cladding layer 340B is hybrid bonded to the cladding layer 340A. Hybrid bonding refers to an advanced chip integration technique that combines both electrical and mechanical bonding at the wafer or die level. Hybrid bonding can allow for two components (e.g., wafers and/or chips) to be directly connected to each other by creating nanoscale interconnections, which can enable higher density, better performance, and lower power consumption as compared to traditional bonding techniques such as wire bonding, flip-chip bonding, etc.

The minimum pitch of turning elements (e.g., in the vertical direction when viewing the interposer from a top-down view) can be determined based at least in part on a minimum optical fiber pitch. The number of columns of turning elements (e.g., in the horizontal direction when viewing the interposer from a top-down view) can be determined based at least in part by the minimum mirror width (e.g., process-defined), and the maximum optical waveguide density that can be routed between turning elements. Illustratively, a 10 μm waveguide pitch within the cladding layer 340A can be considered safe, as described above. Such a pitch can limit the maximum number of columns of turning elements to 11 in one example. In one embodiment, assuming a 127 μm pitch for the turning elements, a 200 gigabit/lane bandwidth, 11 columns of turning elements, and 7 turning elements per column within 1 mm interposer shoreline, the maximum optical bandwidth density that can be achieved using the optical interconnect can be approximately 15.4 Tb/s/mm. Accordingly, the optical interface shown in FIGS. 3A and 3C can be used to achieve optical bandwidth densities that are greater than or equal to about 10 Tb/s/mm to match electrical bandwidth densities.

Figure 4A:
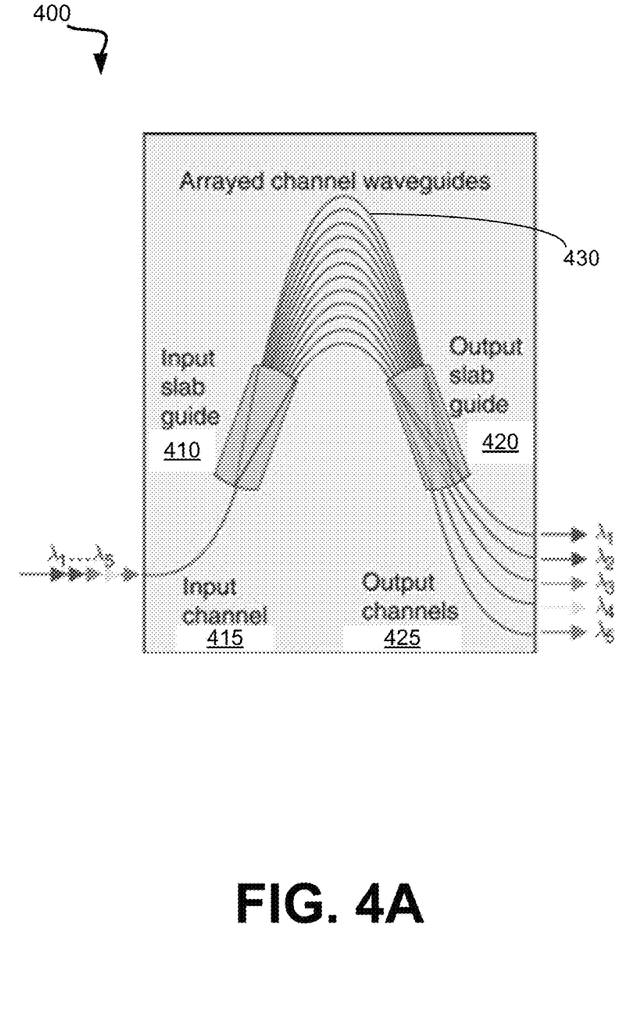
FIGS. 4A-4B are diagrams of example implementations of arrayed channel waveguides that can be implemented within an optical interface, according to some embodiments.
Figure 4B:
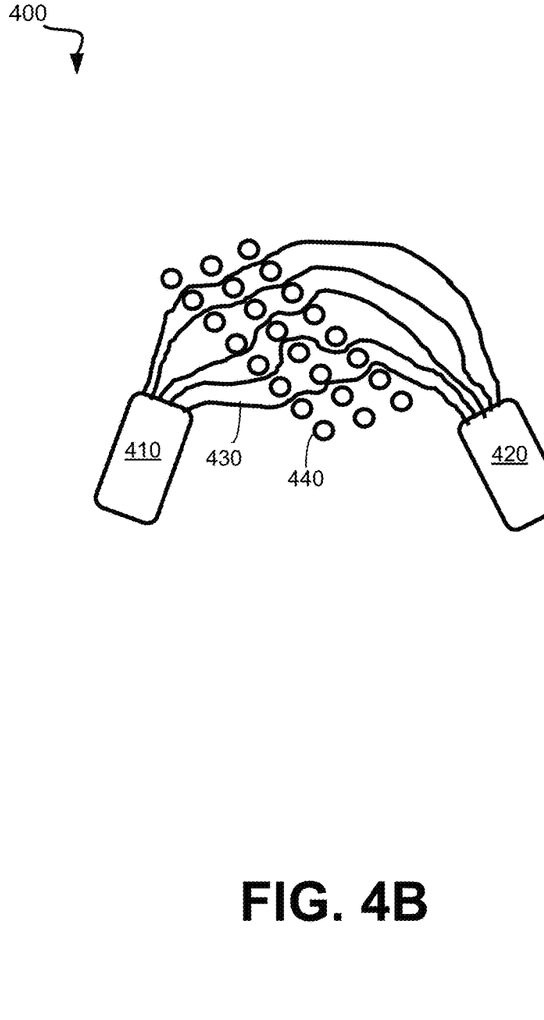

FIGS. 4A-4B are diagrams of an example device 400, according to some embodiments. In some embodiments, device 400 is an interconnect (e.g., interconnect 140-1 of FIGS. 1-2C). Device 400 can include input slab guide 410, output slab guide 420, and a set of arrayed channel waveguides 430. Device 400 can include input channel 415 to receive input optical signals within a single optical fiber. Device 400 can include output channels 425. Each channel 425 corresponds to a respective output optical signal. In some embodiments, as shown in FIG. 4B, device 400 includes multiple through vias 440, and the arrayed channel waveguides 430 are routed around through vias 440.

Figure 5:
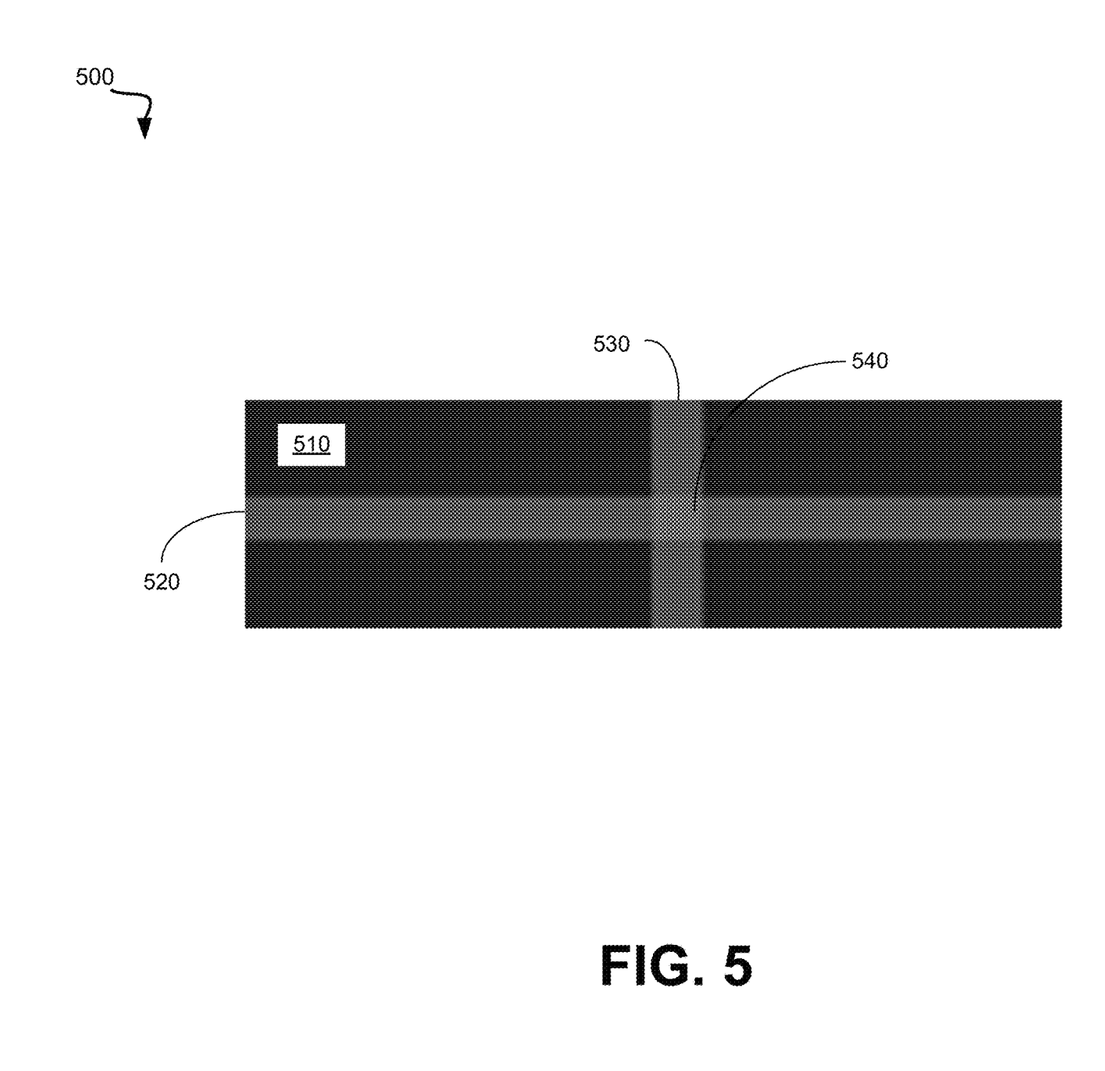
FIG. 5 is a diagram of an example implementation of a waveguide routing solution within an optical interface, according to some embodiments.

FIG. 5 is a diagram of a system 500 including a device implementing a 2D waveguide routing solution. More specifically, the device can include substrate 510 including waveguides 520 and 530 formed therein. Waveguides 520 and 530 can be formed on the same level and can cross at intersection 540. Insertion loss and crosstalk can be reduced to a sufficiently low amount by fine tuning the crossing dimensions.

Figure 6A:
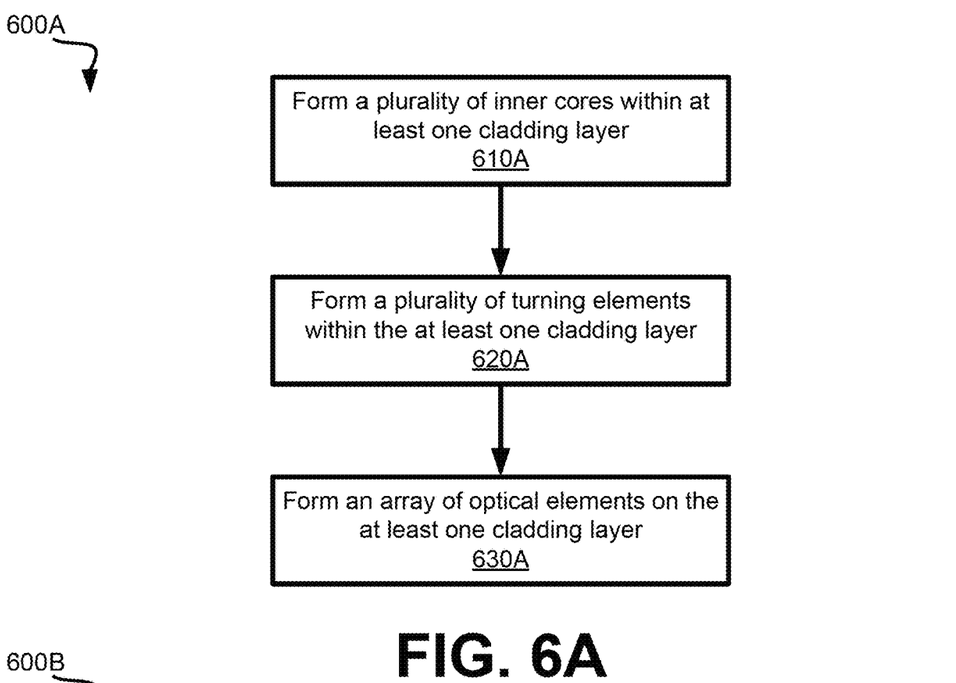
FIGS. 6A-6B are flowcharts of example methods to implement high bandwidth density optical interfaces for co-packaged optical devices including photonic integrated circuits (PICs), according to some embodiments.

FIG. 6A is a flowchart of an example method to fabricate high bandwidth density optical interfaces for co-packaged optical devices including photonic integrated circuits (PICs), according to some embodiments.

At block 610A, a plurality of inner cores is formed within at least one cladding layer. In some embodiments, the at least one cladding layer includes a first cladding layer and a second cladding layer formed on the first cladding layer, where a first plurality of inner cores is formed within the first cladding layer and a second plurality of inner cores is formed within the second cladding layer. In some embodiments, forming the second cladding layer on the first cladding layer includes hybrid bonding the second cladding layer to the first cladding layer.

At block 620A, a plurality of turning elements is formed within the at least one cladding layer. For example, the plurality of turning elements can be formed within the first cladding layer. Each inner core the plurality of inner cores of the at least one cladding layer (e.g., the first cladding layer) is associated with a respective turning element of the plurality of turning elements.

At block 630A, an array of optical elements is formed on the at least one cladding layer. For example, the array of optical elements can be formed on the first cladding layer. Each optical element of the array of optical elements is associated with a respective turning element of the plurality of turning elements. Further details regarding blocks 610A-630A are described above with reference to FIGS. 1A-5.

Figure 6B:
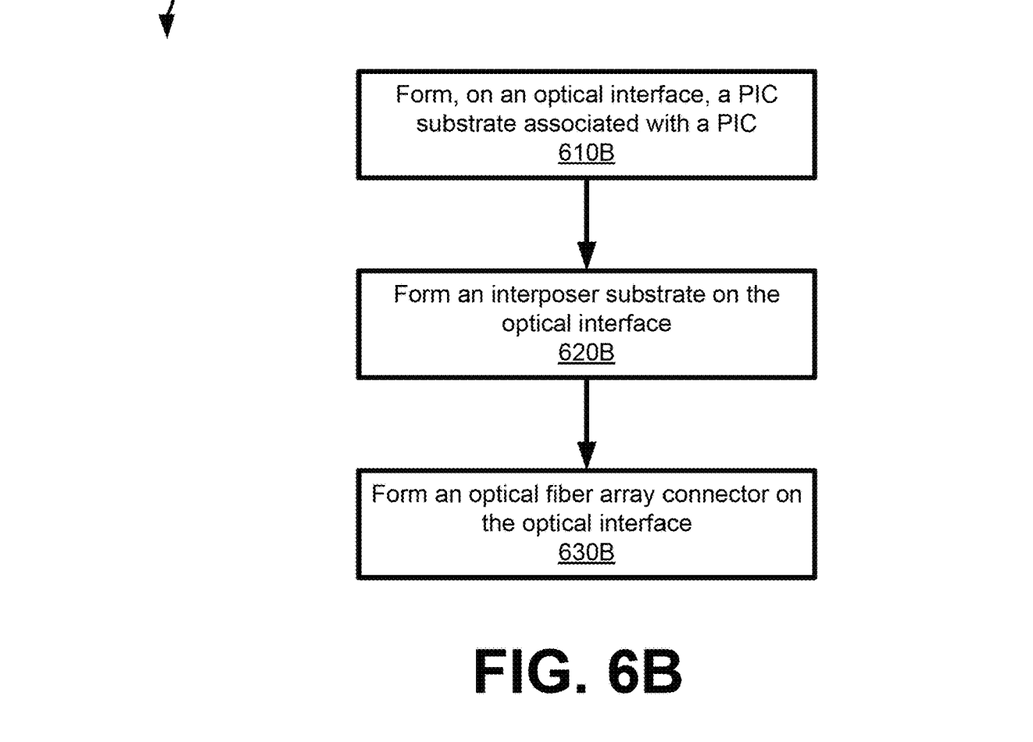

FIG. 6B is a flowchart of an example method 600B to implement high bandwidth density optical interfaces for co-packaged optical devices including photonic integrated circuits (PICs), according to some embodiments.

At block 610B, a PIC substrate associated with a PIC is formed on an optical interface. More specifically, the PIC substrate can be formed on a cladding layer of the optical interface.

At block 620B, an interposer substrate is formed on the optical interface. More specifically, the interposer substrate can be formed on the cladding layer.

At block 630B, an optical fiber array connector is formed on the optical interface. More specifically, the optical fiber array connector can be formed on an array of optical elements of the optical interface. Further details regarding blocks 610B-630B are described above with reference to FIGS. 1A-6A.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular implementations may vary from these exemplary details and still be contemplated to be within the scope of the present disclosure.

As used herein, the singular forms "a," "an," and "the" include plural references unless the context clearly indicates otherwise. Thus, for example, reference to "a precursor" includes a single precursor as well as a mixture of two or more precursors; and reference to a "reactant" includes a single reactant as well as a mixture of two or more reactants, and the like.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or." When the term "about" or "approximately" is used herein, this is intended to mean that the nominal value presented is precise within +10%, such that "about 10" would include from 9 to 11.

The term "at least about" in connection with a measured quantity refers to the normal variations in the measured quantity, as expected by one of ordinary skill in the art in making the measurement and exercising a level of care commensurate with the objective of measurement and precisions of the measuring equipment and any quantities higher than that. In certain embodiments, the term "at least about" includes the recited number minus 10% and any quantity that is higher such that "at least about 10" would include 9 and anything greater than 9. This term can also be expressed as "about 10 or more." Similarly, the term "less than about" typically includes the recited number plus 10% and any quantity that is lower such that "less than about 10" would include 11 and anything less than 11. This term can also be expressed as "about 10 or less."

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to illuminate certain materials and methods and does not pose a limitation on scope. No language in the specification should be construed as indicating any non-claimed element as essential to the practice of the disclosed materials and methods.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A system comprising:
   an interposer substrate;
   a photonic integrated circuit (PIC) substrate associated with a PIC;
   an optical fiber array connector associated with an optical fiber array; and
   an optical interface between the PIC and the optical fiber array, wherein the optical interface comprises:
      a cladding layer, formed on the interposer substrate, having a plurality of inner cores of waveguides and a plurality of turning elements formed therein, wherein each inner core the plurality of inner cores is associated with a respective turning element of the plurality of turning elements; and
      an array of optical elements formed between the cladding layer and the optical fiber array connector, wherein each optical element of the array of optical elements is associated with a respective turning element of the plurality of turning elements.

2. The system of claim 1, wherein the array of optical elements comprises a microlens array.

3. The system of claim 1, wherein the array of optical elements comprises a metalens array.

4. The system of claim 1, wherein each turning element of the plurality of turning elements comprises a mirror.

5. The system of claim 1, wherein the optical interface further comprises a second cladding layer, formed on the cladding layer, having a plurality of second inner cores formed therein, wherein each second inner core of the plurality of second inner cores is configured to transmit an optical signal to a respective inner core of the plurality of inner cores via evanescent wave coupling.

6. The system of claim 5, wherein the second cladding layer is hybrid bonded to the cladding layer.

7. The system of claim 1, wherein the optical interface achieves an optical bandwidth density that is greater than or equal to about 10 terabits per second per millimeter (Tb/s/mm).

8. The system of claim 1, wherein the cladding layer comprises a micro-trench array, each micro-trench of the micro-trench array containing a turning element of the plurality of turning elements.

9. A method comprising:
   forming an optical interface to be placed between a photonic integrated circuit (PIC) associated with a PIC and an optical fiber array connector associated with an optical fiber array, wherein forming the optical interface comprises:
      forming a plurality of inner cores of waveguides within a cladding layer;
      forming a plurality of turning elements of the optical interface within the cladding layer, wherein each inner core the plurality of inner cores is associated with a respective turning element of the plurality of turning elements; and
      forming an array of optical elements of the optical interface on the cladding layer, wherein each optical element of the array of optical elements is associated with a respective turning element of the plurality of turning elements; and
   integrating the optical interface within a system comprising the PIC, the optical fiber array, and an interposer substrate, wherein the cladding layer is formed on the interposer substrate.

10. The method of claim 9, further comprising forming, on the cladding layer, a second cladding layer having a plurality of second inner cores formed therein, wherein each second inner core of the plurality of second inner cores is configured to transmit an optical signal to a respective inner core of the plurality of inner cores via evanescent wave coupling.

11. The method of claim 10, wherein forming the second cladding layer on the cladding layer comprises hybrid bonding the second cladding layer to the cladding layer.

12. The method of claim 9, further comprising:
- forming, on the cladding layer, a photonic integrated circuit (PIC) substrate associated with a PIC;
- forming, on the cladding layer, an interposer substrate; and
- forming, on the array of optical elements, an optical fiber array connector.

* * * * *